INVENTORS
EDWARD P. FLEMING
T. CLEON FITT
BY
ATTORNEY

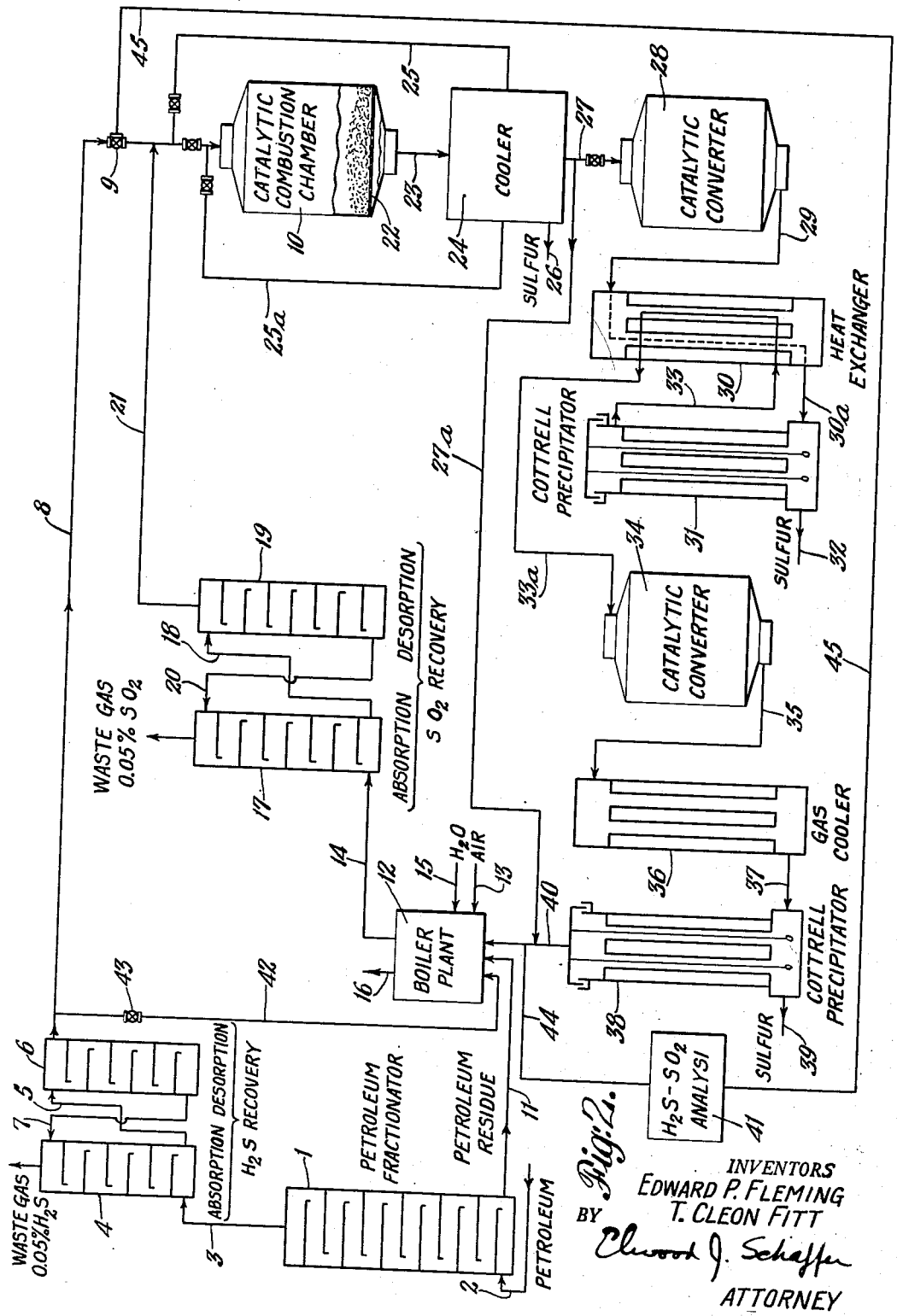

ated May 13, 1958

2,834,653

PRODUCTION OF SULFUR FROM HYDROGEN SULFIDE AND SULFUR DIOXIDE

Edward P. Fleming, Los Angeles, and Theodore C. Fitt, Selby, Calif., assignors to American Smelting and Refining Company, New York, N. Y., a corporation of New Jersey Application February 24, 1953, Serial No. 338,314

5 Claims. (Cl. 23—225)

This invention relates to a process for the production of sulfur from hydrogen sulfide and sulfur dioxide. More particularly, it relates to a process for the production of sulfur from these materials in a substantially pure state.

The reaction between hydrogen sulfide and sulfur dioxide proceeds in accordance with the equation:

$$2H_2S + SO_2 \rightarrow 2H_2O + 3S + \text{heat}$$

Theoretically, it should be possible to obtain reaction temperatures of about 1130° C. from the reaction heat of the autogenous reaction when the pure gases are reacted in proportions of two mols of hydrogen sulfide for each mol of sulfur dioxide. However, it has been found quite unexpectedly that the maximum reaction temperature obtainable under these conditions is about 600° C. and this only when the reactants are passed in heat exchange relationship with the products of reaction under ideal or substantially ideal heat exchange conditions. It has been found further, that as the reactants are diluted the reaction temperature drops off slowly until the diluent gases in the mixture, including one of the reactants in amounts greater than two mols of hydrogen sulfide for each mol of sulfur dioxide, reach about 60% by volume of the gaseous reactant mixture. At this dilution the reaction temperature is about 400° C. With further dilution, the reaction temperatures drop off sharply.

In one aspect, the invention comprehends a process for reacting hydrogen sulfide with sulfur dioxide to form elemental sulfur by establishing a gaseous stream of the reactants in which any diluent gases contained in the stream, including one of the reactants in amounts greater than two mols of hydrogen sulfide for each mol of sulfur dioxide, are not in excess of about 60% by volume of the stream. The so-established stream is passed through a fixed bed of a solid catalyst and reacted therein in a zone in the catalyst at temperatures of about 400–600° C.; these reaction temperatures in the zone being maintained by the heat of reaction. Thereafter, the elemental sulfur is recovered from the products of reaction.

For best results, the gaseous stream contains two mols of hydrogen sulfide for each mol of sulfur dioxide and the stream is a substantially pure mixture of these reactants, i. e., one in which the reactants constitute more than 90% of the constituents in the stream. Preferably, the velocity of the gaseous stream through the catalyst is below that at which the reaction zone in the catalyst has any appreciable motion in the direction of the stream.

The equilibrium of the reaction between hydrogen sulfide and sulfur dioxide in such that the reaction does not proceed to completion. With the above-mentioned concentrations and conditions, the reaction is about 75% or more complete, and the exit gases from the reaction zone may be further reacted to convert the unreacted gases therein to additional sulfur. This may be accomplished by cooling the exit gases to precipitate the sulfur and then passing the residual gases over a catalyst in one or more additional stages. Even when the formation of sulfur is carried out in a plurality of stages, the concentration of the unreacted hydrogen sulfide and sulfur dioxide in the gases issuing from the final stage may be higher than is desirable or higher than that permitted to avoid atmospheric pollution upon the discharge of the residual gases from the system.

In another aspect, the invention comprehends reacting a stream of the reactants, in which any diluent gases that may be present are not in excess of about 60% by volume, in the presence of a catalyst to obtain elemental sulfur and a tail gas which contains unreacted hydrogen sulfide and sulfur dioxide. The tail gas is burned with an oxygen-containing gas in a combustion zone, after which the products of combustion are separated into a sulfur dioxide gas in which any diluent gases that may be present are not in excess of about 60% by volume, and a second tail gas which is discarded. The sulfur dioxide gas which preferably is substantially pure is then recycled to the gaseous stream of reactants.

One of the objects and advantages of this aspect of the invention is that it provides a process in which the sulfur values in waste hydrogen sulfide and sulfur dioxide gases are efficiently converted to high grade sulfur and in which the residual waste gases are discharged to the atmosphere substantially free of the sulfur values originally contained in them. In addition, it provides a closed system for accomplishing these results. Other objects and advantages will be apparent from the more detailed description set forth hereinafter.

A feature of the invention resides in burning sufficient sulfur-containing material or materials in the combustion step to convert these sulfur values into sulfur dioxide, thereby supplying sufficient sulfur dioxide for the process. Thus, for example, hydrogen sulfide, sulphurous petroleum residues, sludge acids, acid sludges, mercaptans, sulfide ores and the like may be used in the combustion zone for this purpose.

Another feature of the invention is that it provides for the production of sulfur from substantially pure hydrogen sulfide gas. In accordance with this feature, a stream of such gas is divided into two paths; the first path constituting about two-thirds of the stream and the second path about one-third thereof. The hydrogen sulfide in the second path is then burned with air or other oxygen-containing gas and the products of combustion are separated into a substantially pure sulfur dioxide and a tail gas. The thus separated sulfur dioxide is reacted with the substantially pure hydrogen sulfide from the first path in the presence of a catalyst to obtain elemental sulfur and a tail gas. The elemental sulfur is recovered and the last mentioned tail gas is returned to the burning step.

The invention is further illustrated in the following examples and the accompanying drawings. It will be understood, however, that the examples and drawings are given for purposes of illustration and that the invention in its broader aspects is not limited thereto.

In the drawings,

Fig. 2 is a diagrammatic flow sheet illustrating the invention in connection with the sulfurous gases produced in petroleum refinery operations.

Figure 1:
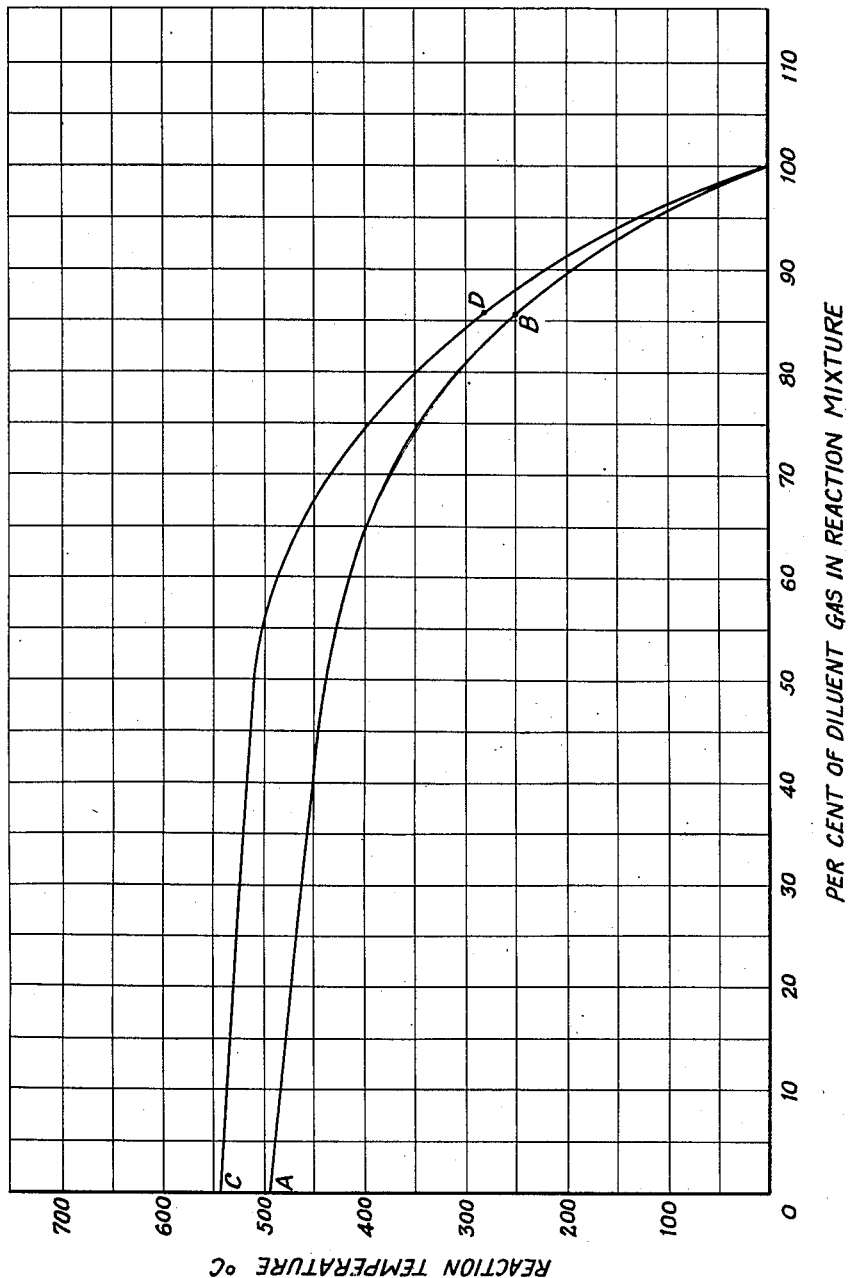
Fig. 1 is a graph showing reaction temperatures as the ordinate vs. concentration of diluents in the reaction mixture as the abscissa.

In the examples, a catalyst chamber consisting of a Pyrex glass cylinder 13" long was used. The chamber was insulated to protect it from heat loss by a layer of aluminum foil in direct contact with the glass, then by a 1" layer of magnesia insulation which, in turn, was covered with another layer of aluminum foil. Thermocouples were provided at intervals of 1¼" through the vertical depth of the catalyst. The thermocouples were numbered in sequence, the uppermost being numbered 1 and the lowermost numbered 8. The catalyst was 8–4 mesh activated alumina catalyst. The total depth of the catalyst in the chamber was about 11". The catalyst was supported by a stainless steel screen. Space velocity is given in terms of cubic feet of gas at standard conditions per second of time per cubic feet of catalyst.

EXAMPLE I

A gas stream of pure reactants was prepared by mixing two volumes of pure hydrogen sulfide for each mol of pure sulfur dioxide fed into the stream. The stream was introduced to the catalyst chamber at room temperature and was passed downwardly through the catalyst at a space velocity of 0.66 for the first 100 minutes, after which the space velocity was increased to 0.99. The catalyst bed temperatures obtained at the thermocouples are given in Table 1.

*Table 1*

| Time, Min. | Gas Stream, Percent by Vol. | | Space Vel. | Temperature, ° C. | | | | | | | | |
|---|---|---|---|---|---|---|---|---|---|---|---|---|
| | $H_2S$ | $SO_2$ | | Gas In | #1 | #2 | #3 | #4 | #5 | #6 | #7 | #8 |
| 0 | 66 | 34 | 0.66 | 16 | 17 | 17 | 17 | 17 | 17 | 17 | 17 | 17 |
| 20 | 66 | 34 | 0.66 | 19 | 22 | 61 | 240 | 477 | 494 | 486 | 486 | 486 |
| 100 | 66 | 34 | 0.66 | 21 | 25 | 31 | 231 | 478 | 494 | 487 | 489 | 489 |
| 160 | 66 | 34 | 0.99 | 23 | 26 | 99 | 418 | 498 | 496 | 494 | 494 | 494 |
| 265 | 66 | 34 | 0.99 | 27 | 28 | 26 | 28 | 449 | 489 | 494 | 494 | 494 |
| 310 | 66 | 34 | 0.99 | 39 | 26 | 25 | 24 | 26 | 482 | 494 | 494 | 494 |
| 445 | 66 | 34 | 0.99 | 28 | 27 | 27 | 27 | 27 | 27 | 420 | 498 | 496 |
| 505 | 66 | 34 | 0.99 | 26 | 26 | 26 | 26 | 26 | 26 | 26 | 432 | 496 |
| 575 | 66 | 34 | 0.99 | 26 | 26 | 26 | 26 | 26 | 26 | 26 | 26 | 225 |

It will be noted that with an unpreheated gas stream the maximum temperature obtained with the pure reactants was about 494° C. regardless of the space velocity. No perceptible migration of the reaction zone was noted with the lower space velocity. With the higher space velocity, however, the reaction zone migrated with the gas stream until after about eight hours the reaction zone had passed through the catalyst.

At the end of the run the catalyst was examined and found to contain a film of sulfur throughout its mass. The catalyst was regenerated by burning with air to remove the sulfur and the above procedure was repeated with the thus regenerated catalyst. The results illustrated in Table 1 were again obtained.

EXAMPLE II

A gas stream was prepared as described in Example I to which was added a diluent gas which was inert to the reactants at the reaction temperatures. To this end, a stream of nitrogen was led into the stream of reactants to form mixtures of the composition set forth in Table 2. The mixed streams were led into the catalyst chamber at room temperature and downwardly through the catalyst bed at the space velocities indicated. The temperatures obtained at the various thermocouples after the indicated time intervals are given in Table 2.

*Table 2*

| Time, Min. | Gas Stream, Percent by Vol. | | | Space Vel. | Temperature, ° C. | | | | | | | |
|---|---|---|---|---|---|---|---|---|---|---|---|---|
| | $H_2S$ | $SO_2$ | $N_2$ | | Gas In | #1 | #2 | #3 | #4 | #5 | #6 | #7 |
| 40 | 66 | 34 | 0 | 0.66 | 16 | 74 | 337 | 496 | 494 | 485 | 480 | 419 |
| 75 | 60 | 30 | 10 | 0.66 | 19 | 34 | 152 | 479 | 488 | 481 | 482 | 477 |
| 75 | 53 | 27 | 20 | 0.66 | 20 | 27 | 38 | 427 | 475 | 468 | 469 | 465 |
| 75 | 46 | 23 | 30 | 0.66 | 21 | 22 | 22 | 99 | 453 | 458 | 458 | 455 |
| 75 | 40 | 20 | 40 | 0.66 | 21 | 22 | 22 | 22 | 24 | 440 | 448 | 446 |
| 60 | 33 | 17 | 50 | 0.66 | 21 | 22 | 22 | 22 | 22 | 24 | 122 | 437 |
| 60 | 10 | 5 | 85 | 0.32 | 18 | 21 | 32 | 208 | 256 | 253 | 244 | 227 |

The maximum temperatures obtained for each dilution are plotted as curve A—B in Fig. 1. From this table and the curve, it will be noted that upon diluting the unpreheated gas stream the maximum temperatures obtainable decrease slowly with dilution until the diluents reach a concentration of about 50–60%, at which concentrations the maximum reaction temperature is about 400° C. Thereafter, the maximum reaction temperatures drop off sharply with increasing dilution. It will also be noted that with the unpreheated gas stream the reaction zone migrated with the gas stream as the dilution increased.

EXAMPLE III

The procedure of Example II was repeated but in this case the gas streams which were led into the reaction chamber were preheated as indicated in Table 3 by indirect heat exchange with the hot products of the reaction. The temperatures obtained at the various thermocouples after the indicated time interval are given in Table 3. Upon examination at the end of the run, it was found that no sulfur was deposited on the catalyst.

*Table 3*

| Time, Min. | Gas Stream, Percent by Vol. | | | Space Vel. | Temperature, ° C. | | | | |
|---|---|---|---|---|---|---|---|---|---|
| | $H_2S$ | $SO_2$ | $N_2$ | | Gas In | #2 | #4 | #6 | #8 |
| 120 | 66 | 34 | 0 | 0.66 | 334 | 548 | 549 | 549 | 548 |
| 30 | 60 | 30 | 10 | 0.66 | 330 | 532 | 535 | 537 | 536 |
| 20 | 54 | 26 | 20 | 0.66 | 321 | 526 | 528 | 531 | 531 |
| 30 | 47 | 23 | 30 | 0.66 | 331 | 520 | 522 | 525 | 525 |
| 30 | 40 | 20 | 40 | 0.66 | 338 | 513 | 513 | 515 | 514 |
| 30 | 34 | 17 | 50 | 0.66 | 334 | 508 | 508 | 508 | 506 |
| 160 | 10 | 5 | 85 | 0.32 | 174 | 174 | 288 | 287 | ------ |

The maximum temperatures obtained for each dilution are plotted as curve C—D in Fig. 1. From this table and the curve, it will be noted that with a preheated gas stream the maximum temperatures obtainable also dropped sharply when the diluents in the stream exceed about 50–60% of the volume of the stream. Likewise, it will be noted that there is no migration of the reaction zone with the stream and that the reaction takes place higher up in the catalyst.

EXAMPLE IV

The procedure of Example I was repeated but in this case the gas stream going to the reaction chamber was moderately preheated by indirect heat exchange with the hot products of reaction. After 40 minutes the space velocity of the stream was increased from 0.66 to 0.99. The temperature of the preheated stream and those at the various thermocouples in the catalyst are given in Table 4.

*Table 4*

| Time, Min. | Gas Stream, Percent by Vol. | | | Space Vel. | Temperature, ° C. | | | | | | | |
|---|---|---|---|---|---|---|---|---|---|---|---|---|
| | $H_2S$ | $SO_2$ | $N_2$ | | Gas In | #1 | #2 | #3 | #4 | #5 | #6 | #7 |
| 10 | 66 | 34 | | 0.66 | 159 | 491 | 512 | 512 | 513 | 514 | 514 | 514 |
| 40 | 66 | 34 | | 0.66 | 158 | 508 | 517 | 518 | 518 | 518 | 518 | 518 |
| 70 | 66 | 34 | | 0.99 | 142 | 494 | 514 | 516 | 518 | 518 | 518 | 518 |

It was found at the end of the run that no sulfur had been deposited on the catalyst. It will be noted that with a moderate amount of preheat in the stream in the order of magnitude of about 140° C. there is no migration of the reaction zone and that the reaction zone extends to the top of the catalyst regardless of the space velocity. It will be noted further from this and the other examples that in the absence of migration or perceptible migration of the reaction zone, the catalyst may be used for an indefinite period without requiring regeneration.

The total heat liberated by the reaction of the pure gases is more than sufficient to raise the temperature of the unpreheated reactants to the reaction temperature. A maximum reaction temperature of about 600° C. can be obtained with a stream composed of two mols of pure hydrogen sulfide for each mol of pure sulfur dioxide by passing the hot products of reaction in heat exchange relation with the incoming gas stream for the reaction, provided heat exchange apparatus of sufficient size is used. For economic reasons, however, a large investment in heat exchange apparatus is undesirable. For this reason, the pure gas stream is advantageously preheated to a temperature below about 400° C. and preferably up to about 335° C. With such an amount of preheat the maximum reaction temperature of the pure reactant is about 500° C.

The reason for the temperature phenomenon of the reaction is not clearly understood. While we do not wish to be bound by any particular theory, it is possible that the results may be explained by the heat of formation of the particular forms of sulfur that may exist under the conditions of the reaction. Thus, the sulfur liberated by the reaction between $H_2S$ and $SO_2$ may consist of sulfur vapor which may be a mixture of sulfur molecules such as $S_8$, $S_6$, $S_2$ and $S$ in equilibrium with each other in accordance with the equation $$3S_8 \rightleftarrows 4S_6; \rightleftarrows S_6 \rightleftarrows 3S_2; \rightleftarrows S_2 \rightleftarrows 2S$$

When the reaction goes to the right, heat is absorbed and when the reaction goes to the left, heat is liberated. A heat reservoir may thus be established due to the heats of formation of the various types of sulfur, and this reservoir may in turn function as a thermal balance which tends to resist wide fluctuations in the reaction temperature regardless of the degree of preheat or absence thereof. In this manner the temperature of the reaction may be maintained in the range of about 400–600° C.

The invention is particularly useful in connection with the sulfurous gases produced in petroleum refining and may be used as illustrated in Fig. 2. The sulfur values in crude petroleum generally are in the range of about 1–6% calculated as sulfur; and, in many so-called "sour crudes," these percentages may be as high as 9% or more. The sulfur values in crude petroleum are present in a variety of forms including high boiling sulfur compounds, hydrogen sulfide and organic compounds such as mercaptans. Upon distilling the crude petroleum in refinery operations, the volatile sulfur compounds are taken off the fractionation column as a dilute gas which may contain as much as 8% or more $H_2S$. The residue from the fractionation also may contain sulfur values in amounts up to 6% or more calculated as sulfur, depending upon the nature of the crude petroleum processed.

One of the features of the invention is that it provides a system wherein essentially all of the gaseous sulfur compounds eliminated during the distillation and the sulfur in the petroleum residue may be converted efficiently into high grade sulfur and in which the waste gases vented from the system do not constitute a nuisance with respect to atmospheric pollution.

Referring now to Fig. 2, the numeral 1 represents a petroleum fractionating column provided with a crude petroleum inlet 2. Crude petroleum is distilled in a conventional manner in the fractionating column where it is separated into a plurality of hydrocarbon fractions which are withdrawn at various points, not shown, along the length of the column. As a result of the fractionation, a hydrogen sulfide gas is withdrawn from the top or upper portion of the column and a petroleum residue is collected in the bottom thereof.

The hydrogen sulfide gases are led through conduit 3 to absorption-desorption apparatus for the recovery therein of a substantially pure hydrogen sulfide gas from the dilute gases. The absorption and desorption of hydrogen sulfide may be accomplished in commercially available systems such as the Girbotol system using diethanolamine as an absorbent. Such a system is described in an article entitled "Sulphur From Sour Gases" by F. G. Sawyer and R. N. Haden in the October 1950 issue of Industrial and Engineering Chemistry, pages 1937–1950. A system of this type is capable of separating a substantially pure hydrogen sulfide gas from a dilute gas containing the same while venting to the atmosphere a waste gas containing less than 0.5% $H_2S$ and as little as 0.05% $H_2S$ or less.

The dilute hydrogen sulfide gases are passed upwardly through absorption tower 4 in counter-current contact with a descending stream of a liquid absorbent, such as for example, diethanolamine. The ascending gases become progressively depleted of their hydrogen sulfide content and the residual gas containing less than 0.5% and as little as 0.05% $H_2S$ or less is vented to the atmosphere as a waste gas. The descending stream of liquid absorbent becomes progressively enriched with hydrogen sulfide and the pregnant absorbent is withdrawn from the bottom of tower 4 and passed through conduit 5 to the upper portion of desorption column 6.

As the pregnant absorbent descends in the stripping tower 6 it is heated to strip it of its hydrogen sulfide content and the depleted absorbent is returned from the lower portion of tower 6 to the upper portion of tower 4 through conduit 7 where it is used again to absorb hydrogen sulfide. Substantially pure hydrogen sulfide may be withdrawn from tower 6 through conduit 8 which is provided with valve 9 and is passed to catalytic combustion chamber 10. The lower portion of tower 6 may be provided with steam coils to supply indirect heat for the stripping of the pregnant solution.

A drying section may also be associated with tower 6. Thus, for example, the upper portion of the tower may be a section in which water is removed from the concentrated hydrogen sulfide gas by cooling and condensation or by counter-current scrubbing with a suitable dehydrating agent such as diethylene glycol, or both.

Petroleum residue that collects in the bottom of fractionator 1 is passed through conduit 11 to a suitable combustion chamber represented by the boiler plant 12. In the boiler plant 12 the petroleum residue is burned with air or other oxygen-containing gas entering through inlet 13 and its sulfur value is converted to sulfur dioxide. The sulfur dioxide containing products of combustion are led through conduit 14 to sulfur dioxide absorption-desorption recovery means. In the boiler plant the hot products of combustion may be passed in indirect contact with water entering the furnace 12 through inlet 15, the water being converted to steam which emerges from outlet 16 and may be used in the various desorption steps described herein. The waste gases vented from tower 4 if they contain sufficient mercaptans or other sulfur values also may be passed to boiler plant 12 and burned therein to recover their sulfur values in the process.

The dilute sulfur dioxide gases passing through conduit 14 may contain as much as 15% or more or as little as 1% or less of sulfur dioxide by volume. The sulfur dioxide content in the dilute gas may be separated therefrom in commercially available systems such as those described and claimed in applicants' United States Patents Nos. 2,295,587 and 2,399,013, using an organic base absorbent such as an organic amine. This system is capable of treating such dilute gases to recover therefrom a substantially pure sulfur dioxide product while discharging to the atmosphere a waste gas containing less than 0.5% and as little as 0.05% or less by volume of $SO_2$.

The dilute sulfur dioxide gas passes through conduit 14 into sulfur dioxide absorption tower 17 where the gas passes upwardly in counter-current contact with a suitable absorbent such as for example dimethylaniline or xylidine. As the gas proceeds through the absorption tower it becomes depleted of its sulfur dioxide content and a waste gas containing less than 0.05% sulfur dioxide may be vented to the atmosphere. The descending stream of absorbent becomes increasingly enriched in sulfur dioxide and the pregnant absorbent is withdrawn from the bottom of tower 17 and passed through conduit 18 to the upper portion of desorption column 19. In column 19 the descending pregnant absorbent is heated to strip it of its sulfur dioxide content by an ascending stream of heat stripping agent, such as a mixture of the absorbent and steam. The stripped absorbent is returned from tower 19 through conduit 20 to absorption tower 17 where it is re-used to absorb additional sulfur dioxide. A substantially pure sulfur dioxide gas may be withdrawn from the desorption tower 19 and is passed through conduit 21 to and downwardly through the catalytic combustion chamber 10 and in contact with a fixed bed of solid catalyst therein.

The lower portion of tower 19 may also be provided with steam coils for supplying indirect heat for the stripping action. A drying section or sections may also be associated with this tower. For example, the upper portion of the tower may be a reflux section which dries the concentrated sulfur dioxide by cooling and condensation. The gases may also be dried or further dried by passing them in counter-current contact with a concentrated dehydrating agent such as concentrated sulfuric acid.

The catalytic combustion chamber 10 may be a suitably insulated chamber containing a suitable catalyst for the reaction between hydrogen sulfide and sulfur dioxide. Preferably, the catalyst in this chamber is an alumina catalyst which may be in the form of particles about ½" to 1" in diameter. The chamber may be filled with the catalyst and the catalyst bed may be supported therein by a steel screen 22 or other suitable means. Although high grade bauxite is the most preferred catalyst in this chamber, any other catalyst for the reaction also may be used to obtain the results described herein.

The hot gases leaving reaction chamber 10 are cooled preferably to about 200° C. in cooler 24 to precipitate the elemental sulfur therein as liquid sulfur which may be recovered through outlet 26. Preferably, the cooler 24 is a heat exchanger for preheating the reactants which may be passed by means of line 25 through the cooler and then by line 25a to the top of reaction chamber 10. If desired, the cooler 24 may be a waste heat boiler for generating steam which may be used elsewhere in the process. In such event, when it is desired to preheat the reactants, it is within the scope of the invention and the claims thereto to preheat the reactants with an equivalent amount of heat from a source other than the reaction heat.

Because the equilibrium condition in the reaction between hydrogen sulfide and sulfur dioxide are such that the reaction does not go to completion, the residual gases from reaction chamber 10 may contain an appreciable amount of unreacted gas which may be as much as 20% or more of the initial reactants. The residual gases may be passed directly to the furnace 12 through lines 27, 27a and 40 or they may, if desired, be further reacted in one or more stages to form additional sulfur after which the residual gases from the last stages may be passed to combustion furnace 12.

Even when multi-stage conversion is used in combination with the reaction chamber 10, the residual gases from the last stage may contain as much as 3% hydrogen sulfide and 1.5% sulfur dioxide or more. To vent gases of such concentration to the atmosphere would give rise to a nuisance in that the gases would unduly pollute the air. Thus passing the residual gases from reaction chamber 10 or the final reaction stage when a multi-stage conversion is employed, to the combustion chamber 12, all the sulfur values in the residual gases are converted to sulfur dioxide which is then returned to the sulfur dioxide absorption system.

When one or more reaction stages in addition to that in chamber 10 are desired, the cooled gases may be passed through conduit 27 to a catalytic converter 28 where the gases pass in contact with a suitable catalyst, preferably high grade bauxite of a size of about one-half to one inch in diameter. The concentration of the unreacted $H_2S$ and $SO_2$ in the cooled gases may be sufficiently great so as to cause the reaction in the converter to proceed at a temperature of about 250°–300° C. by the exothermic heat of the reaction.

The residual gases from converter 28 then may be passed through conduit 29 through heat exchanger 30 from which they emerge at about 130° C. and then may be passed through conduit 30a into a Cottrell precipitator 31 where sulfur in the cooled gases is electrically precipitated and withdrawn through outlet 32. Any sulfur that is condensed in heat exchanger 30 flows through conduit 30a and is recovered at outlet 32. The cooled gases from the precipitator 31 then may pass through conduit 33 back through heat exchanger 30 where they may be heated to about 200° C. The hot gases then may pass through conduit 33a to a second catalytic converter 34 similar to converter 28 where they may be reacted further at temperatures of about 150°–200° C. in the presence of a suitable catalyst which preferably also is activated alumina having a particle size of about ¼ to ½ inch in diameter. The gases then may be passed through conduit 35 into gas cooler 36 and then through conduit 37 into a second Cottrell precipitator 38 where the sulfur is removed from the cooled gases and withdrawn through outlet 39. The residual gases then may be passed through conduit 40 to combustion chamber 12. Any sulfur that condenses in cooler 36 passes into precipitator 38 through conduit 37. If desired, the precipitators 31 and 38 or these precipitators together with coolers 30 and 36 may be replaced by liquid sulfur scrubbing towers.

In order that the reaction between the hydrogen sulfide and sulfur dioxide may proceed efficiently, and in order that unnecessarily large apparatus may be avoided, it is desirable that substantially pure reactants be used and that they be present in the stream entering reaction chamber 10 in amounts of about two mols of hydrogen sulfide for each mol of sulfur dioxide. Deviations from this ratio of the reactants will cause a similar deviation in the ratio of these constituents in the exit gases from the final sulfur recovery unit.

Accordingly, the flow of the reactants may be controlled in accordance with the composition of the final residual gases. This may be accomplished with hydrogen sulfide-sulfur dioxide analyzer means 41 connected to conduit 40 through conduit 44 which automatically analyzes the final residual gases for these constituents. In accordance with the analysis of the gases in conduit 40, the valve 9 in conduit 8 may be opened or closed so as to maintain a ratio of approximately two mols of hydrogen sulfide for each mol of sulfur dioxide delivered to chamber 10. Although the valve 9 may be manually operated, it preferably is opened or closed automatically by means 45 operatively connecting analyzer 41 and valve 9.

Instead of conducting a multi-stage conversion process in the above-described manner, the gases alternatively may be cooled sufficiently in cooler 24 to condense therefrom substantially all of the sulfur and water to obtain an uncondensed gas of substantially the same composition as the mixture entering the initial reaction zone 10. With such a procedure the uncondensed gas may be treated in converter 28 and heat exchanger 30 in the same way as the initial mixture was treated in chamber 10 and cooler 24 respectively except that the second stage apparatus may be correspondingly smaller. The electrical precipitator 31 may or may not be used. The uncondensed gases from heat exchanger 30 may be passed directly to boiler 12 or they may be further reacted in a third stage in converter 34 and cooler 36 which may be similar to but smaller than converter 28 and heat exchanger 30 respectively. This alternative procedure is not as desirable as the earlier described multi-stage conversion process because the condensed sulfur tends to become colloidally dispersed in the condensed water vapor and is more difficult to recover.

In the refining of certain crude petroleums, an excess of hydrogen sulfide may become available. In such event, any excess hydrogen sulfide may be burned to sulfur dioxide in furnace 12. Such excess hydrogen sulfide may be passed to the furnace in the form of a substantially pure gas or as a dilute gas. Preferably, the excess hydrogen sulfide, as a substantially pure gas, is passed through conduit 42 to furnace 12. A valve 43 in conduit 42 may control flow of excess hydrogen sulfide. This valve may be a pressure-actuated valve operated by the pressure in conduit 8.

In certain commercial operations, hydrogen sulfide alone is available for the production of sulfur. Thus, for example, substantially pure hydrogen sulfide may be extracted from natural gas. Such hydrogen sulfide may be divided into two paths, one of which takes at least about two-thirds and the second less than about one-third of the gas. The first path may be led into conduit 8 and the second into conduit 42. Thereafter, sulfur may be produced from these two gas streams in the manner already described herein. Thus, the residual gases from lines 27 or 40 together with sufficient hydrogen sulfide from conduit 42 may be burned in furnace 12 to supply to the reaction chamber 10 about 1 mol of sulfur dioxide for each 2 mols of hydrogen sulfide entering the chamber from conduit 8.

The practice of the invention results in the recovery of a high grade sulfur product. As much as about 85% of the sulfur values in the reactants may be recovered as sulfur in a single pass through a system using the initial reaction chamber 10 only. This may be increased to as much as 96% by a single pass through a multi-stage system. However, since the residual gases are returned to the system through the boiler plant 12, the over-all recovery in the process is approximately 99.5% of the sulfur values entering the system regardless of the number of conversion stages in the system. Moreover, because of the concentration of the reactants a more compact system may be used, thereby resulting in lower capital investment per pound of sulfur produced.

This application is a continuation-in-part of application Serial No. 277,202 filed by the present applicants on March 18, 1952, entitled Production of Sulfur from Hydrogen Sulfide and Sulfur Dioxide.

We claim:

1. In a method of producing sulfur from hydrogen sulfide and sulfur dioxide involving passing a gaseous stream of said reactants through a bed of catalyst contained in a catalytic reaction zone to form sulfur and recovering the thus formed sulfur, the improvement which comprises passing said stream through said zone at atmospheric pressure; controlling the amount of any diluent gases contained in said stream passing to said zone, including one of said reactants in amounts greater than two mols of hydrogen sulfiide for each mol of sulfur dioxide, to a value not in excess of about 60% by volume of said stream, whereby said stream of reactants is capable of sustaining a reaction temperature of about 400–600° C. in said catalyst; passing said stream of reactants through said catalyst at a space velocity of at least about 0.66 cubic foot of gas as measured at standard conditions of temperature and pressure per second per cubic foot of catalyst but at space velocity which is below that at which migration of the zone of reaction out of the catalyst in the direction of said stream is avoided; whereby a reaction zone having a temperature in the range of about 400–600° C. is established an autogenously sustained in said catalyst zone and substantially all of the sulfur formed by the reaction is in a gaseous state and poisoning of the catalyst due to sulfur deposition thereon is avoided during the process; passing the hot products of reaction to a cooling zone; cooling and condensing sulfur from said hot gases in said cooling zone; and recovering the thus condensed sulfur.

2. A process according to claim 1 in which said catalyst is a fixed bed of alumina catalyst.

3. A process according to claim 2 in which the gas stream passing to the reaction zone is preheated up to about 335° C. by indirect heat exchange with the hot products from the reaction zone, and the reaction in said reaction zone proceeds at about 400–550° C.

4. A process according to claim 1 in which the residual gases from said sulfur condensation step are passed to a combustion zone in which unreacted hydrogen sulfide in said residual gas is burned with an oxygen-containing gas to convert the hydrogen sulfide to sulfur dioxide, separating the resulting products of combustion into a tail gas and a sulfur dioxide gas containing essentially all of sulfur dioxide in said products of combustion, discarding the tail gas, and recycling the separated sulfur dioxide gas to said initial stream of reactants whereby essentially all of the sulfur values in the gases passing to the process are recovered as elemental sulfur.

5. A method according to claim 1 for producing sulfur from a stream of substantially pure hydrogen sulfide in a closed system in which a stream of said hydrogen sulfide is divided into two paths, the first path taking approximately two-thirds and the second path approximately one-third of the stream, burning the hydrogen sulfide in the second path with an oxygen-containing gas to convert the hydrogen sulfide therein to gaseous sulfur dioxide, separating the products of combustion in to a tail gas and into a substantially pure sulfur dioxide gas, discarding said tail gas, uniting the hydrogen sulfide in said first path with the thus separated sulfur dioxide, passing said united stream through said reaction zone to obtain said hot products of reaction, condensing said elemental sulfur in said hot products of reaction in said cooling and condensing step, and recycling the residual gases from said cooling and condensing step to said burning step whereby essentially all of the sulfur values in the hydrogen sulfide passing to the process are recovered as elemental sulfur.

References Cited in the file of this patent

UNITED STATES PATENTS

| | | |
|---|---|---|
| 2,169,379 | Barkholt | Aug. 15, 1939 |
| 2,200,928 | Lindblad | May 14, 1940 |
| 2,413,714 | Keeling | Jan. 7, 1947 |
| 2,630,374 | Miller | Mar. 3, 1953 |
| 2,630,375 | Miller | Mar. 3, 1953 |

FOREIGN PATENTS

| | | |
|---|---|---|
| 220,632 | Germany | Apr. 5, 1910 |
| 146,141 | Great Britain | June 24, 1920 |